Patented Mar. 26, 1935

1,995,929

UNITED STATES PATENT OFFICE 1,995,929

CHLORO- AND BROMO-DERIVATIVES OF 2 - AMINONAPHTHALENE - 1 - SULPHONIC ACID AND PROCESS OF PREPARING THEM

Max Lange, Frankfort-on-the-Main, and Theodor Jacobs, Wiesbaden, Germany, assignors to General Aniline Works, Inc., New York, N. Y., a corporation of Delaware No Drawing. Application June 13, 1932, Serial No. 617,042. In Germany June 15, 1931

9 Claims. (Cl. 260—129)

The present invention relates to new chloro- and bromo-derivatives of 2-aminonaphthalene-1-sulphonic acid and to a process of preparing them; more particularly it relates to compounds of the following general formula:

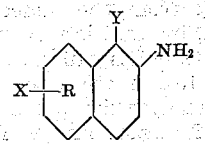

wherein Y represents a sulphonic acid group or a sulphonic acid salt group and X means that the nucleus R contains a chloro- or bromo-atom.

We have found that the products may easily be prepared by replacing in a compound of the following formula:

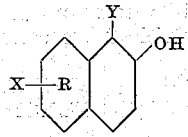

wherein Y represents a sulphonic acid group or a sulphonic acid salt group and X means that the nucleus R contains a chloro- or bromo-atom, the hydroxy group by the amino group according to one of the known methods using aqueous ammonia and an alkali sulphite. This process may preferably be carried out by heating in a closed vessel at a temperature of about 100° C. to about 200° C., advantageously at a temperature of 130° C. to 170° C., the hydroxy compounds of the above formula with aqueous ammonia of 25% strength in the presence of a sulphite, preferably in the presence of ammonium sulphite.

This result was surprising since it could not be foreseen whether the halogen atom would remain in the molecule. In view of the conditions of the reaction it was to be expected that the halogen atom would be split off or replaced by the NH2-residue.

The halogen derivatives of the 2-hydroxynaphthalene-1-sulphonic acid, used as starting materials, may, for instance, be obtained by transforming halogenated 2-hydroxynaphthalenes into derivatives sulphonated in 1-position, according to the process as described in "Chemical News", volume 74, (1896), page 302, left column, lines 9 to 13 relating to the manufacture of 6-bromo-2-hydroxynaphthalene-1-sulphonic acid.

The following examples serve to illustrate the invention, but they are not intended to limit it thereto, the parts being by weight:

(1) 31 parts of technical sodium salt of 6-chloro-2-hydroxynaphthalene-1-sulphonic acid (obtainable, for instance, by treating 6-chloro-2-naphthol with sulphuric acid or chlorosulphonic acid according to the aforesaid statements in the literature) which correspond with 28 parts of a pure product, are heated in a closed vessel for about 30 hours at about 150° C. with 30 parts of aqueous ammonia of 25% strength, 12 parts of ammonium sulphite and 30 parts of water. The reaction product is taken up in water, the ammonia is distilled off, the solution, if necessary, is freed from impurities by filtration and the new product is precipitated from the filtrate by addition of sodium chloride. The sodium salt of 6-chloro-2-aminonaphthalene-1-sulphonic acid dissolves in cold water in the ratio of 1:30. It crystallizes from a large quantity of alcohol in the form of white, brilliant leaflets. By addition of mineral acid to the aqueous solution of the sodium salt, the free acid precipitates in the form of white flakes which appear under the microscope as thin needles. The acid melts at a very high temperature with decomposition, it is difficultly soluble in water and yields a yellowish, difficultly soluble diazo-compound.

(2) 156 parts of technical sodium salt of 7-chloro-2-hydroxynaphthalene-1-sulphonic acid, corresponding with 140 parts of a pure product, are treated with 200 parts of aqueous ammonia of 25% strength, 60 parts of ammonium sulphite and 100 parts of water as indicated in Example 1. The sodium salt of 7-chloro-2-aminonaphthalene-1-sulphonic acid thus obtained dissolves in cold water in the ratio of 1:20. Otherwise, the sodium salt and the free acid have properties similar to those of the product described in Example 1.

(3) 170 parts of technical sodium salt of 7-bromo-2-hydroxynaphthalene-1-sulphonic acid, containing 163 parts of a pure product, are treated with 200 parts of ammonia of 25% strength, 50 parts of ammonium sulphite and 150 parts of water as indicated in Example 1. There is thus obtained 7-bromo-2-aminonaphthalene-1-sulphonic acid. Its sodium salt dissolves in cold water in the ratio of 1:20. Its other properties and those of the free acid correspond approximately with those of the compounds described in the above examples.

By using as starting materials instead of the salts the free acids, the ammonia salts of the halogenated amino-sulphonic acids are obtained.

We claim:

1. The process which comprises replacing in a compound of the following formula:

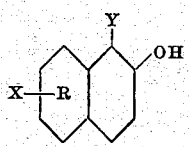

wherein Y represents a sulphonic acid group or a sulphonic acid alkali metal salt group and X means that the nucleus R contains a chloro- or bromo-atom, the hydroxy group by the amino group using aqueous ammonia and ammonium sulphite.

2. The process which comprises heating in a closed vessel at a temperature of about 100° C. to about 200° C. a compound of the following formula:

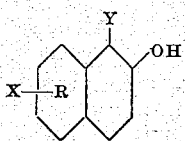

wherein Y represents a sulphonic acid group or a sulphonic acid alkali metal salt group and X means that the nucleus R contains a chloro- or bromo-atom, with aqueous ammonia of 25% strength in the presence of ammonium sulphite.

3. The process which comprises heating in a closed vessel at a temperature of about 150° C. for about 30 hours the sodium salt of 6-chloro-2-hydroxynaphthalene-1-sulphonic acid with aqueous ammonia of 25% strength in the presence of ammonium sulphite.

4. The process which comprises heating in a closed vessel at a temperature of about 150° C. for about 30 hours the sodium salt of 7-chloro-2-hydroxynaphthalene-1-sulphonic acid with aqueous ammonia of 25% strength in the presence of ammonium sulphite.

5. The process which comprises heating in a closed vessel at a temperature of about 150° C. for about 30 hours the sodium salt of 7-bromo-2-hydroxynaphthalene-1-sulphonic acid with aqueous ammonia of 25% strength in the presence of ammonium sulphite.

6. The compounds of the following general formula:

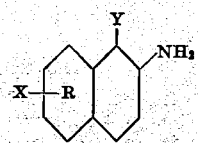

wherein Y represents a sulphonic acid group or a sulphonic acid alkali metal salt group and X means that the nucleus R contains a chloro- or bromo-atom.

7. 6-chloro-2-aminonaphthalene-1-sulphonic acid, separating from the aqueous solution of the sodium salt, by addition of mineral acid, in the form of white flakes which appear under the microscope as thin needles, melting at a very high temperature with decomposition, being difficultly soluble in water and yielding a yellowish, difficultly soluble diazo-compound.

8. 7-chloro-2-aminonaphthalene-1-sulphonic acid, separating from the aqueous solution of the sodium salt, by addition of mineral acid, in the form of white flakes which appear under the microscope as thin needles, melting at a very high temperature with decomposition, being difficultly soluble in water and yielding a yellowish, difficultly soluble diazo-compound.

9. 7-bromo-2-aminonaphthalene-1-sulphonic acid, separating from the aqueous solution of the sodium salt, by addition of mineral acid, in the form of white flakes which appear under the microscope as thin needles, melting at a very high temperature with decomposition, being difficultly soluble in water and yielding a yellowish, difficultly soluble diazo-compound.

MAX LANGE.
THEODOR JACOBS.